(No Model.) 4 Sheets—Sheet 1.
C. B. BEACH.
METHOD OF UTILIZING OLD WHEEL TIRES.
No. 335,878. Patented Feb. 9, 1886.
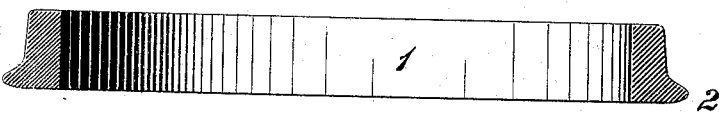
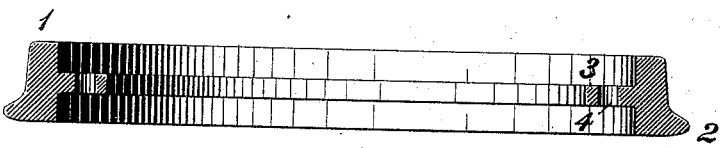
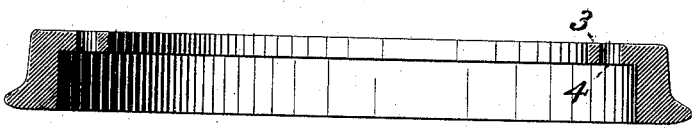
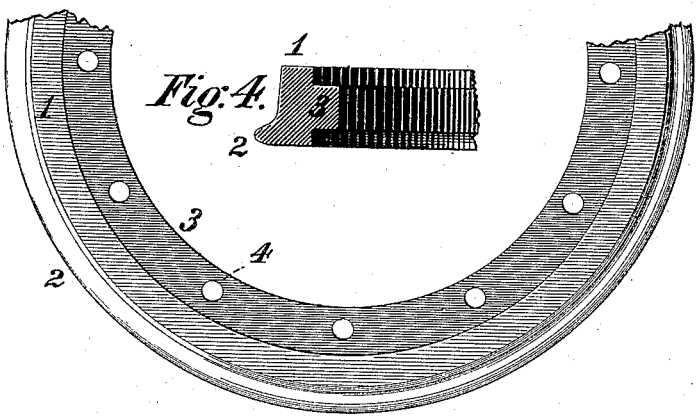
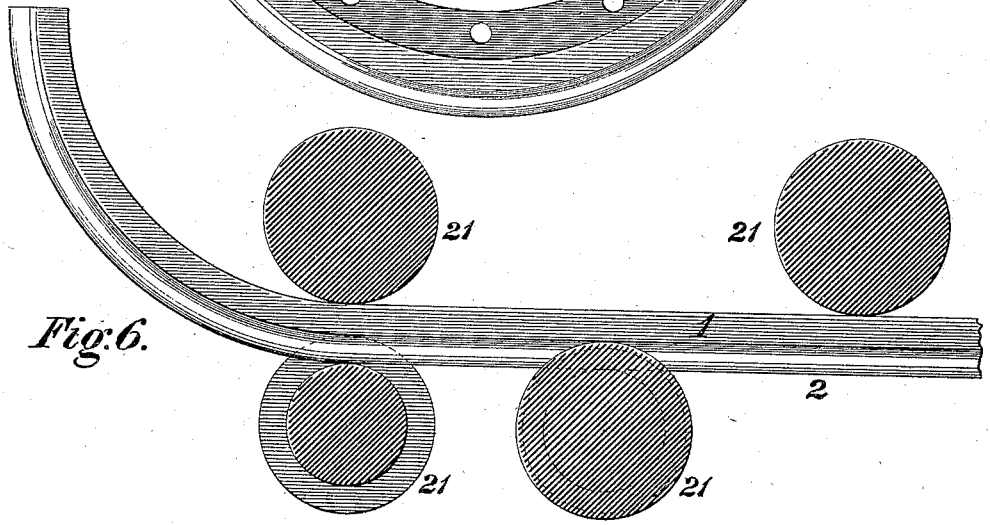
WITNESSES:
INVENTOR.
Clifton B. Beach,
BY George H. Christy
ATTORNEY.

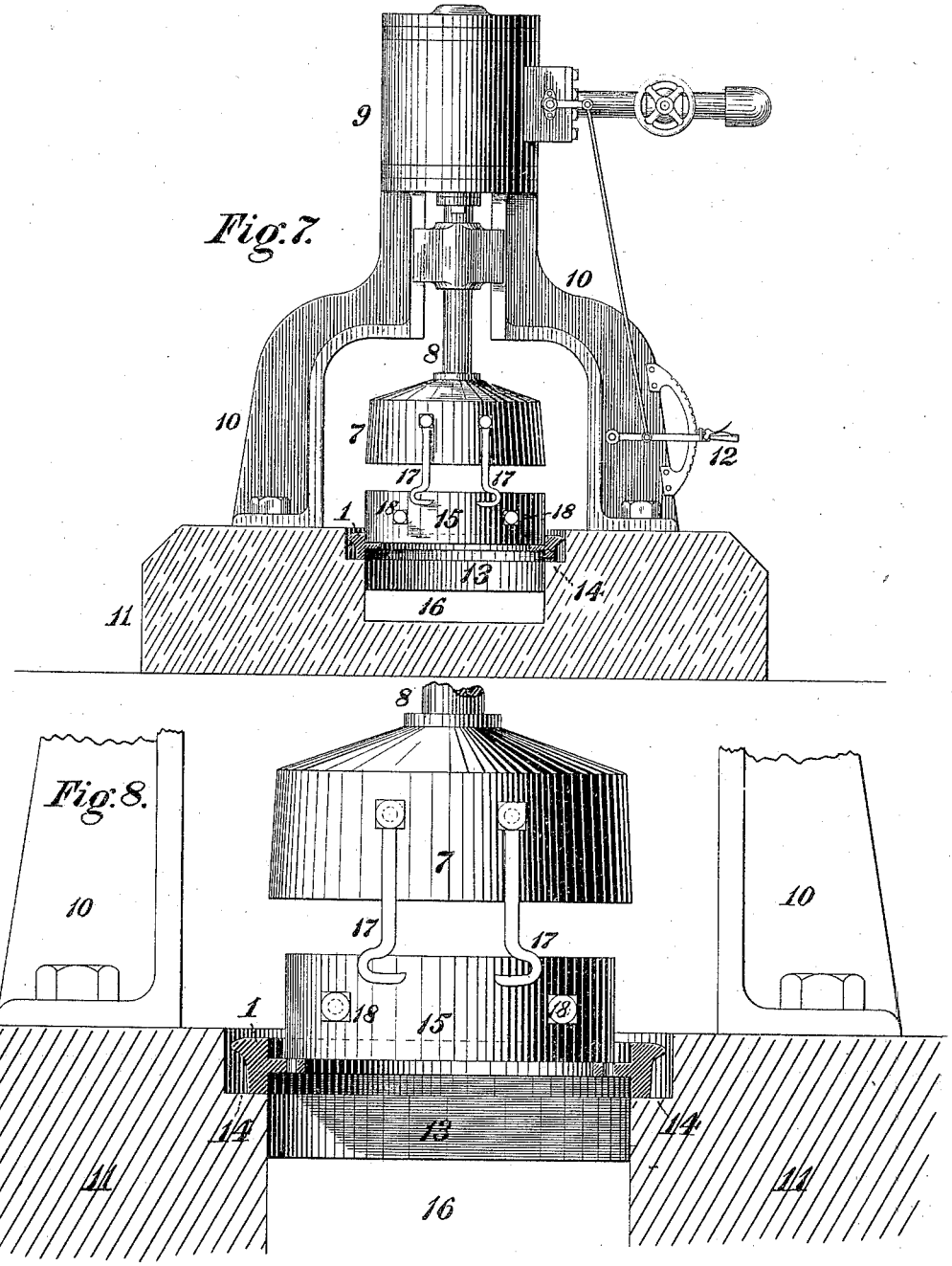

(No Model.) 4 Sheets—Sheet 3.

C. B. BEACH.
METHOD OF UTILIZING OLD WHEEL TIRES.

No. 335,878. Patented Feb. 9, 1886.

WITNESSES:
J. Snowden Bell
C. M. Clarke

INVENTOR.
Clifton B. Beach
BY George N. Christy
ATTORNEY.

N. PETERS, Photo-Lithographer, Washington, D. C.

(No Model.) 4 Sheets—Sheet 4.
C. B. BEACH.
METHOD OF UTILIZING OLD WHEEL TIRES.
No. 335,878. Patented Feb. 9, 1886.
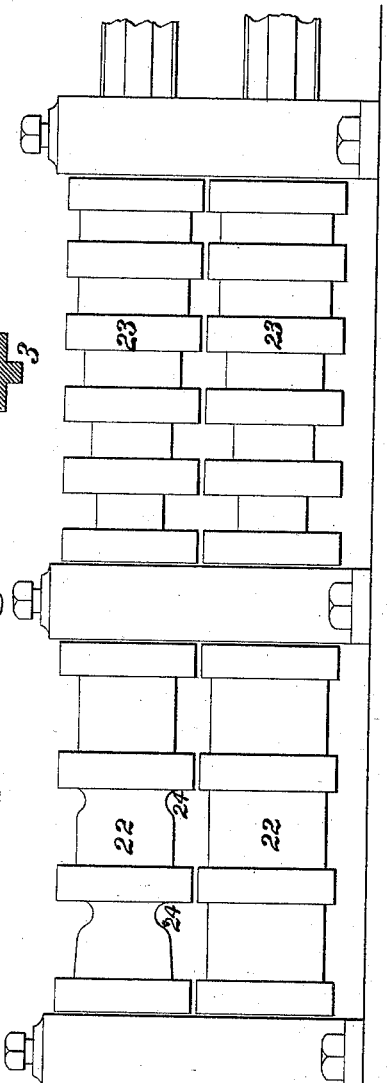
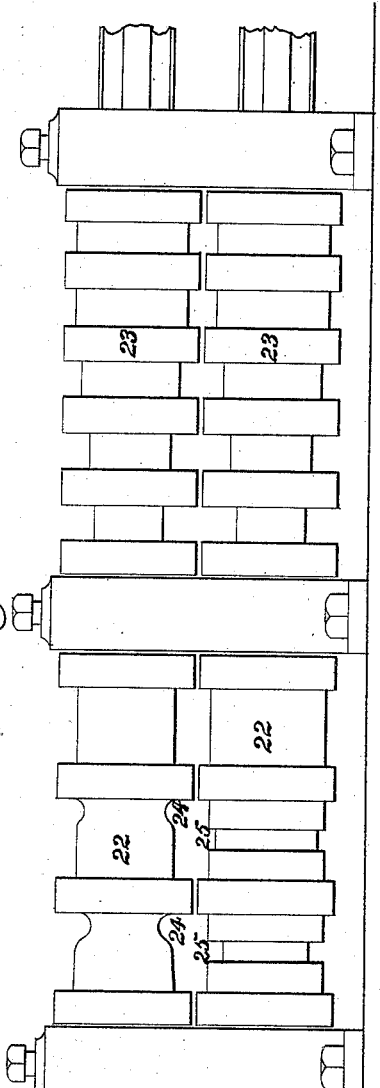
WITNESSES:
INVENTOR.
Clifton B. Beach
BY George H. Christy
ATTORNEY.

UNITED STATES PATENT OFFICE.

CLIFTON B. BEACH, OF CLEVELAND, OHIO.

METHOD OF UTILIZING OLD WHEEL-TIRES.

SPECIFICATION forming part of Letters Patent No. 335,878, dated February 9, 1886.

Application filed July 18, 1884. Serial No. 138,000. (No model.)

*To all whom it may concern:*

Be it known that I, CLIFTON B. BEACH, a citizen of the United States, residing at Cleveland, in the county of Cuyahoga and State of Ohio, have invented or discovered certain new and useful Improvements in Process for the Conversion of Steel Railroad-Tires into Bars or Billets, of which improvements the following is a specification.

Figure 9:
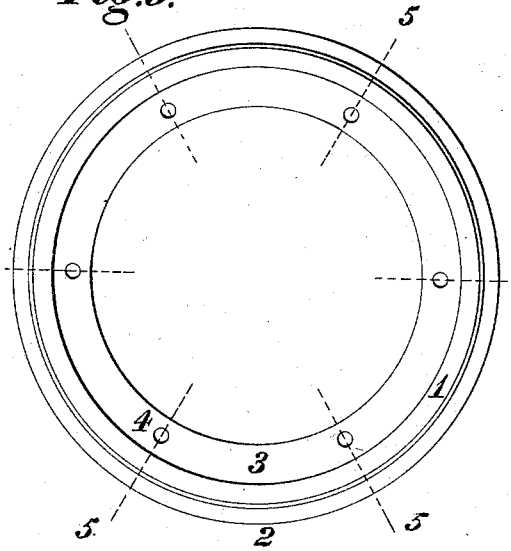
Figure 10:
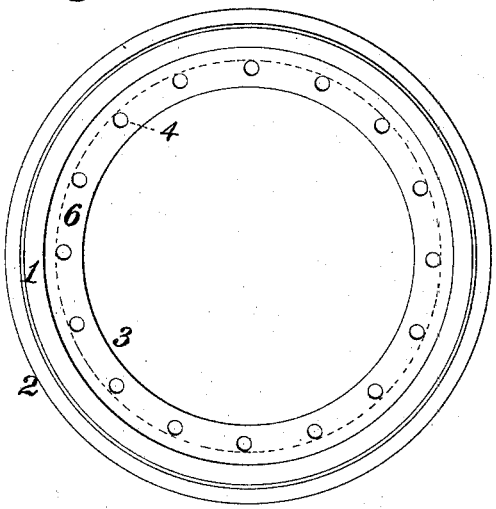
Figure 11:
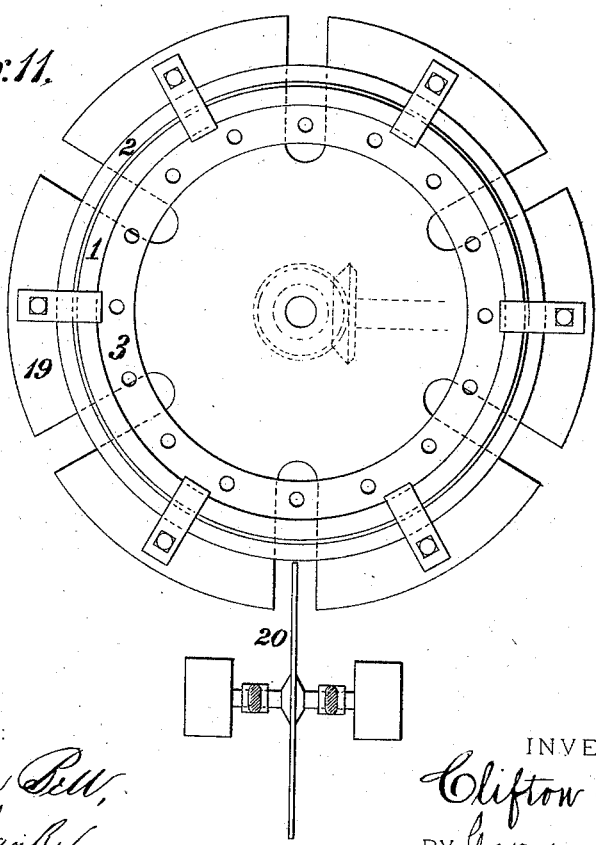

In the accompanying drawings, which make part of this specification, Figures 1, 2, 3, and 4, Sheet 1, are transverse sections through different forms of railroad-wheel tires adapted to the practice of my invention; Fig. 5, a plan view of the tire shown in Fig. 2; Fig. 6, a transverse section through a series of straightening-rolls; Figs. 7 and 8, Sheet 2, views, partly in elevation and partly in section, of an apparatus for effecting the detachment of the inner flanges of tires; Figs. 9 and 10, Sheet 3, plan views of tires illustrating, respectively, different methods of dividing the same; Fig. 11, a plan view of a table and saw for dividing a tire radially; Figs. 12 and 13, Sheet 4, side views in elevation of roll-trains adapted for the reduction of tires to bars of rectangular section; and Figs. 14 and 15, sections of tires from which the whole and a portion, respectively, of the inner flanges have been detached.

The object of my invention is to effect the economic utilization of worn or defective railroad-wheel tires by the conversion of the same into solid and seamless rods, bars, billets, or shapes of any desired section, and adaptable to use in the manufacture of springs, wagon or carriage tires, and various other articles for the production of which steel blooms or billets are required.

To this end my improvements consist in a certain novel process of detaching from the tire the whole or a portion of its inner flange, dividing the tire circumferentially, and reducing it from annular form and irregular section to a straight rectangular bar or billet of greater length and less area of transverse section than the tire from which it is formed.

The improvements claimed are hereinafter fully set forth.

The steel tires of car and locomotive wheels, with the exception of the comparatively small proportion of those used on locomotive driving-wheels, which are known as "flat" or "blind" tires, are provided with an external flange on one side, which serves to retain the vehicle in which they are employed in proper lateral relation to the rails of the tracks which it traverses. Such flanged tires may be divided, generally, into two classes—to wit, one in which the inner surface of the tire is substantially cylindrical or of slightly conical form, in correspondence with the periphery of the body or center of the wheel on which it is fitted, and the other having an internal flange or flanges usually provided with bolt-holes, and serving to connect the tire with the wheel center.

The difficulty encountered in reducing the section of tires of either of the classes above specified to a desired form has been such that prior to my invention, so far as my knowledge and information extends, their utilization, when worn out and condemned as unfit for railroad-service, has been limited to sale, at a comparatively low price, for the purpose of remelting, as ordinary scrap-steel.

In the attempted reduction by rolling of tires having outer flanges only, the objection has obtained that the flange tends to fold over or buckle upon the tread, and thereby to form a seam in the product, such objection being found in a correspondingly increased degree with tires having both outer and inner flanges—as those of the Allen, Paige, and other composite wheels—and where, as is usually the case, bolt-holes are formed in the inner flange or flanges, their presence, irrespective of the tendency of the flange to fold over, renders the incorporation of said flange with the body of the tire in a seamless product impracticable.

My improvements effect a substantial economy by enabling a worn-out tire to be converted directly into merchantable bar steel, which, by reason of the superior quality of material ordinarily used in railroad-tires is particularly desirable as a product, and possesses a materially greater market value than the scrap for which unserviceable tires are at present sold.

In the practice of my invention, as applied to tires 1, having the usual external flanges, 2, and internal flanges, 3, provided with a series of bolt-holes 4, as in Figs. 2 to 5, inclusive, I first provide for the elimination of the open spaces formed by said bolt-holes from the body of metal to be subsequently reduced to a bar. In the tires of wheels of the Paige type, Figs. 4 and 9, the inner flange, 3, is comparatively heavy, being from two to three inches in thickness, and hence contains a considerable quantity of metal which it is desirable to utilize. To this end tires of such character are, by preference, divided by radial cuts 5, passing through the centers of the several bolt-holes 4 into a series of segments, each of which constitutes a separate bar or bloom, the semicircular recesses formed by the division of the bolt-holes being located in its ends, and therefore presenting no obstacle to its reduction by rolling, and all the metal of the inner flange being retained. The inner flanges of the tires of wheels of the Allen type are of smaller dimensions, being usually about five-eighths of an inch in thickness, and in tires of this class, as shown in Figs. 2, 3, and 10, I prefer to detach either a portion or the whole of the inner flange from the tire, and for convenience of manipulation to cut the tire apart at one point only after such detachment, so as to form only a single bloom in lieu of a series, as in the case of tires having materially thicker inner flanges. The detachment of the inner flanges may be most desirably effected by blows of a steam-hammer, acting either directly upon said flange or upon an interposed hammer-block, as presently to be described, and where it is desired to utilize a portion of the inner flange the same is scored or partially severed in a circle of the diameter desired prior to being subjected to the action of the hammer. The segments formed by the division of the tire, or, as the case may be, the tires from which all or a portion of their inner flanges have been detached, and which have been cut apart at one point, as before specified, are passed between straightening-rolls, by which they are brought to the form of straight bars or blooms, the transverse section of which, where the inner flange has been entirely detached, corresponding substantially with that shown in Fig. 14, and where a portion only of the inner flange has been detached with that of Fig. 15, and said blooms are reduced to the desired section by successive passes between pairs of rolls having supporting roughing-grooves for the reception of the flange or flanges of the tire and finishing grooves of proper form and dimensions to convert the bloom into a rod, bar, or shape of relatively-reduced transverse area and desired cross-section, and of correspondingly greater length, said bars being subsequently cut to lengths desired for utilization in the manufacture for which they may be required.

For the purpose of clearly illustrating the practice of my invention I have shown in the drawings mechanism whereby the several operations above recited may be properly performed by those skilled in the art, but the same is not herein claimed as of my invention, as it constitutes the subject-matter of a separate application for Letters Patent by me.

The detachment of the inner flange, 3, of the tire is effected by the apparatus shown in Figs. 7 and 8. A hammer, 7, is fixed upon the piston-rod 8 of a piston working in a steam-cylinder, 9, which is supported upon housings or standards 10 above an anvil, 11, and is provided with valve mechanism of any suitable description, operated by a hand-lever, 12. A cylindrical recess, 13, the diameter of which is equal to or slightly greater than the inside diameter of the tire 1, is formed in the anvil 11, concentric with the hammer 7, a plane table or bearing, 14, upon which the tire is supported, being formed at the top of the recess 13. A hammer-block, 15, which, when the whole of the inner flange, 3, is to be detached, is of such diameter as to fit closely within the tire, is placed upon the flange 3 to transmit thereto the impact of the hammer, and by a blow or blows of the hammer upon said block the flange 3 is severed from the tire and drops with the block 15 into the lower portion of the recess 13, from which it may be removed through a lateral opening, 16. The hammer-block is removed from the recess to admit of the insertion of another tire by means of hooks or catches 17, pivoted or coupled by flexible connections to the hammer 7, and adapted to engage pins or catches 18 on the hammer-block, and thereby to lift and suspend the same above the recess until the next tire to be operated on is placed in position therein, after which it is lowered and deposited upon the flange, the hooks disconnected from the catches, and the hammer raised preparatory to effecting the detachment of the inner flange, as before.

It will be obvious that the hammer-block 15 may, if preferred, be dispensed with and the hammer caused to act directly upon the flange; but I deem the employment of an intermediate block more desirable by reason of the facility and accuracy of adjustment thereby afforded.

If it be desired to detach only a portion of the inner flange, 3, as in Fig. 8, a circle 6, Fig. 10, is scored or deeply marked thereon with a suitable tool, so as to effect a partial severance of and institute a line of least resistance to fracture upon the flange, said line being preferably located substantially tangential to the outside of the series of bolt-holes 4, so as to allow as large a proportion as practicable of the metal of the flange consistently with the elimination of the bolt-holes, to be retained upon the tire. The hammer-block 18 being in such case made of corresponding diameter with the circle marked upon the flange, the detachment of the inner portion of the latter from the tire is effected upon said circle as a parting-line by the impact of the hammer on the block. Upon the detachment of the inner flange, either in whole or in part, as above described, the tire is removed from the anvil, placed in a suitable furnace, and after having been brought to a proper heat fixed upon a revolving table, 19, and divided radially at one or more points by a saw, 20, or other cutting mechanism suitable for the purpose. In the case of tires having heavy internal flanges I contemplate, as before stated, the retention of the entire body of metal of the inner flange, and therefore, in lieu of detaching a portion of said flange for the purpose of eliminating the bolt-holes, I cut or divide the tire radially through each of the bolt-holes, thereby forming a series of separate segmental blooms, such operation being conveniently effected by the use of the revolving table 19. The next succeeding operation is to convert the divided tire into a straight bar or bloom, which is effected by opening it out at the line of division (when cut only at a single point) and passing it through a series of straightening-rolls, 21, Fig. 6, by which it is brought into proper condition to be submitted to the reducing-rolls, and the separate segments of a tire which is divided at more than one point may be straightened in a similar manner. The tire being now in the form of a straight bar or series of bars without openings, and having a flange on one or on two sides, according as the whole or a portion, respectively, of its inner flange has been detached, is reduced to the section desired by the rolls shown in Figs. 12 and 13, the former being adapted for the reduction of tires from which the whole of the inner flange has been removed, as in Fig. 14, and the latter for that of tires from which a portion only of said flange has been detached, as in Fig. 15. In each instance a pair of roughing-rolls, 22, and a pair of finishing-rolls, 23, mounted in suitable housings and provided with proper driving-gearing, is employed.

To prevent the buckling or folding over of the external and internal flanges, 2 3, of the tires upon the body of metal thereof, supporting grooves or channels 24 25, adapted to receive and reduce said flanges, are formed upon the roughing-rolls 22, the grooves 24 serving to force down the external flange, 2, into the body of the tire and the grooves 25 acting similarly upon the internal flange, 3. Two or more supporting-grooves of successively-decreasing depth may be provided, the grooves 25 being dispensed with, as in Fig. 12, if the inner flange has been wholly detached from the tire. The remaining groove or grooves of the roughing-rolls are of the ordinary rectangular section, and the grooves of the finishing-rolls 23 are of such form and dimensions as are requisite to reduce by successive passes the bloom of rectangular section produced by the roughing-rolls to the finished shape or section desired, their construction in such particular being familiar to those skilled in the art of metal-rolling, and not forming *per se* part of my present invention.

In the application of my invention to wheels not having a separate tire, in which the body or center and the rim or tread are formed in a single piece, the web of the wheel is marked or scored adjacent to the rim and detached therefrom, as before described, and the rim, which is then substantially similar to a separate tire, is reduced to the condition of a bar or billet by the process and apparatus before set forth.

I claim herein as my invention—

1. The improvement in the method of converting flanged steel tires into billets or bars, which consists in first eliminating therefrom all openings which are surrounded by a continuous wall of metal, reducing the tire thereafter to rectangular section by rolling in roughing-rolls having supporting-grooves suited to prevent the folding over or buckling of its flange or flanges in the operation, and finally reducing the section so formed to a billet or bar by rolling in finishing-rolls, substantially as set forth.

2. The improvement in the method of converting flanged steel tires into billets or bars, which consists in detaching from the tire any desired proportion of the metal of its inner flange, reducing the tire thereafter to rectangular section by rolling in roughing-rolls having supporting-grooves suited to prevent the folding over or buckling of its flange or flanges in the operation, and reducing the section so formed to a billet or bar by rolling in finishing-rolls, substantially as set forth.

In testimony whereof I have hereunto set my hand.

CLIFTON B. BEACH.

Witnesses:
ELTON HOYT,
G. W. SHUMWAY.